United States Patent [19]

Svigelj et al.

[11] 4,166,058

[45] Aug. 28, 1979

[54] HEAT SENSITIVE PRIMER EXHIBITING COLOR CHANGE AND CONTAINING A RESIN BLEND, ELEMENTAL SULFUR, AND A DYE

[75] Inventors: John A. Svigelj, Mansfield; Thomas G. Rabito, Ashland, both of Ohio

[73] Assignee: The Goodyear Tire & Rubber Company, Akron, Ohio

[21] Appl. No.: 932,873

[22] Filed: Aug. 11, 1978

[51] Int. Cl.$^2$ ............................ C08K 3/06; C08K 5/34
[52] U.S. Cl. .................................. 260/38; 260/42.24; 260/42.28
[58] Field of Search ................ 260/42.24, 833, 837 R, 260/38, 42.28

[56] References Cited

U.S. PATENT DOCUMENTS

| | | | |
|---|---|---|---|
| 3,445,411 | 5/1969 | Dunham | 260/42.28 X |
| 3,480,691 | 11/1969 | Jeff et al. | 260/42.28 X |
| 3,780,132 | 12/1973 | Lohr | 260/38 X |
| 4,020,038 | 4/1977 | O'Mahoney | 260/42.24 X |

*Primary Examiner*—Sandra M. Person
*Attorney, Agent, or Firm*—J. D. Wolfe

[57] ABSTRACT

A color sensitive primer comprising 100 parts of an ethylenically unsaturated elastomer; 300 to 800 parts of a phenolic resin, A or B stage; 0 to 100 parts inorganic filler; 10 to 30 parts epoxy resin; about 0.5 to 10 parts heat sensitive dye; and about 0.5 to 3 parts sulfur.

4 Claims, No Drawings

HEAT SENSITIVE PRIMER EXHIBITING COLOR CHANGE AND CONTAINING A RESIN BLEND, ELEMENTAL SULFUR, AND A DYE

This invention relates to an improved primer adhesive and to the method of use to assure a superior bond.

Many adhesives or primer adhesives require the pieces be heated during the adhering operation to achieve a proper cure to thereby develop a satisfactory cure between the pieces. Since the heat conduction of the pieces varies according to its thickness and the nature of each piece it is difficult to determine when the adhesive or adhesive primer has reached the desired state of cure.

The object of this invention is to provide an adhesive or adhesive primer that gives visible evidence of its state of cure.

In general the adhesive or adhesive primer of this invention comprises:
- 100 parts of an ethylenically unsaturated elastomer;
- 300 to 800 parts of a phenolic resin, A or B stage;
- 0 to 100 parts inorganic filler;
- 10 to 30 parts epoxy resin;
- about 0.5 to 10 parts heat sensitive dye;
- about 0.5 to 3 parts sulfur;
- about 0.5 to 3 parts accelerator for the ethylenically unsaturated elastomers in a sulfur cure system, preferably of sulfenamide accelerators.

The above compounded ethylenically unsaturated elastomer is applied as a solvent solution or dispersion to the pieces, viz., the piece of steel, to be adhered to prime surfaces before the adhesive is applied. For instance, a standard railroad brake shoe stock and metal of said shoe are cleaned with a solvent where needed and painted with the above primer and the solvent is allowed to evaporate until dry to the touch. Then a standard brake adhesive, such as a nitrile phenolic available under the trade names Pliobond 1012 or 1014 is applied to work pieces, i.e., the brake shoe and the metal, before they are brought into contact. These work pieces are heated to develop a bond between the adhesive and the work pieces. Upon heating these work pieces it was observed that initially the primer coat was blue at room temperature, but after heating for 10 minutes at 350° F. the primer became bright green. By the time work pieces were heated to 350° F. for 30 minutes the color changed to dark green and in 45 minutes the color changed to brown. Thus by observing the color change the nature of the adhesive bonding being developed is readily monitored.

A preferred recipe for the primer of this invention is as follows, all parts by weight:
- 100 parts of a copolymer of butadiene/acrylonirile (32-33% acrylonitrile)
- 600 parts of resole phenol-formaldehyde resin
- 0.5 to 10 parts phthalocyanine blue dye
- 0.5 to 3 parts sulfur
- 0.5 to 3 parts N-oxydiethylene benzothiazole-2-sulfenamide
- 5 to 80 parts calcium carbonate
- 10 to 30 parts epoxy resin of epichlorodhydrin bisphenol A dispersed in 5 to 30 percent by weight or at least sufficient solvent to render the dispersion spreadable by painting or swabbing.

Generally any of the usual paint solvents such as ketones, chlorinated hydrocarbons, acetate, aromatic and alcohols or mixtures thereof can be used to clean the work pieces and to make the dispersion. A preferred solvent is a mixture of methyl ketone and butylacetate.

The following heat sensitive dyes can be used instead of the phthalocyanine blue dye in the above recipe to give similar indications of the state of cure due to color change:
- Phthalocyanine pigments
- Phthalocyanine blue
- Victoria green
- Calcozine green
- Calco alizarine green.

The adhesives useful in this invention are solvent dispersions of a nitrile rubber and a thermosetting phenolformaldehyde resin such as The Goodyear Tire & Rubber Company's Pliobond 1012, 1014, 1018 or 1063.

Representative ethylenically unsaturated elastomers are the copolymers of butadiene-acrylonitrile where the acrylonitrile content is 18 to 45 percent by weight, polybutadienes, polyisoprenes, butadiene-styrene and broadly the related rubbers of diolefins of 4 to 10 carbon atoms alone or as copolymers with the alpha olefins of 2 to 20 carbon atoms.

Representative of the epoxy resins useful in this invention in the above reipes are those described in U.S. Pat. No. 3,719,629 with diglycidyl ether bisphenol A being a preferred one.

While certain representative embodiments and details have been shown for the purpose of illustrating the invention it will be apparent to those skilled in this art that various changes and modifications may be made therein without departing from the spirit or scope of the invention.

What is claimed is:

1. A color sensitive primer comprising
- 100 parts of an ethylenically unsaturated elastomer;
- 300 to 800 parts of a phenolic resin, A or B stage;
- 0 to 100 parts inorganic filler;
- 10 to 30 parts epoxy resin;
- about 0.5 to 10 parts heat sensitive dye;
- about 0.5 to 3 parts sulfur.

2. The primer of claim 1 wherein the heat sensitive dye is a phthalocyanine blue dye.

3. The primer of claim 1 wherein about 0.5 to 3 parts of a sulfenamide accelerator is used.

4. The primer of claim 1 wherein the epoxy resin is diglycidyl ether bisphenol A.

* * * * *